United States Patent
Ungchusri et al.

[11] Patent Number: 5,931,476
[45] Date of Patent: *Aug. 3, 1999

[54] SEAL WITH EXTENDED WEAR SLEEVE

[75] Inventors: Tep Ungchusri, Woodlands; Sergio A. Castillo, Jr., Spring, both of Tex.

[73] Assignee: FMC Corporation, Chicago, Ill.

[ * ] Notice: This patent issued on a continued prosecution application filed under 37 CFR 1.53(d), and is subject to the twenty year patent term provisions of 35 U.S.C. 154(a)(2).

[21] Appl. No.: 08/786,938

[22] Filed: Jan. 23, 1997

[51] Int. Cl.$^6$ .................................................. F16L 21/00
[52] U.S. Cl. ........................... 277/603; 277/607; 277/614
[58] Field of Search ................................ 285/45, 55, 370; 277/603, 607, 615, 627, 608, 614

[56] References Cited

U.S. PATENT DOCUMENTS

| | | | |
|---|---|---|---|
| 3,472,533 | 10/1969 | Turner | 285/55 |
| 3,501,158 | 3/1970 | Tillman, III | 277/167.5 |
| 3,508,766 | 4/1970 | Kessler et al. | 285/55 |
| 3,656,771 | 4/1972 | Stout | 277/207 A |
| 3,990,712 | 11/1976 | Dechavanne | 277/198 |
| 4,089,534 | 5/1978 | Litherland | 277/198 |
| 4,265,457 | 5/1981 | Lambie | 277/198 |
| 4,445,716 | 5/1984 | Hoffman | 285/55 |
| 4,817,993 | 4/1989 | Zoboli | 277/207 A |
| 4,930,791 | 6/1990 | Ungchosri et al. | 277/198 |
| 5,566,984 | 10/1996 | Abberna et al. | 285/55 |

FOREIGN PATENT DOCUMENTS

| | | | |
|---|---|---|---|
| 0414339 | 2/1991 | European Pat. Off. | E21B 33/03 |
| 3605944 | 8/1987 | Germany | F16L 23/20 |
| WO9107617 | 5/1991 | WIPO | F16L 25/00 |

*Primary Examiner*—Anthony Knight
*Assistant Examiner*—John L. Beres
*Attorney, Agent, or Firm*—Henry C. Query, Jr.

[57] ABSTRACT

A bore seal assembly for sealing between first and second adjoining tubular members which comprises a cylindrical seal sleeve having a bore and two radially outwardly extending sealing lips for engaging a seal pocket formed in the adjoining ends of the first and second tubular members, a cylindrical wear sleeve mounted within the bore for supporting the seal sleeve within the seal pocket, and an elongated erosion sleeve extending longitudinally from the wear sleeve into at least the first tubular member, whereby the erosion sleeve protects the first tubular member against erosion.

2 Claims, 3 Drawing Sheets

SEAL WITH EXTENDED WEAR SLEEVE

BACKGROUND OF THE INVENTION

1. Field of the Invention

The present invention relates to annular bore seals for use in pipe connectors and swivel joints, among other devices. More particularly, the invention relates to such a seal which includes an extended wear sleeve for protecting the adjacent areas of the pipe connectors and swivel joints that are subject to erosive wear.

2. Description of Related Art

Bore seals are used to provide a fluid-tight seal between adjoining pipes or members of swivel joints and pipe connectors. U.S. Pat. No. 4,930,791, which is owned by the assignee hereof, discloses a bore seal assembly mountable within a seal pocket formed in the adjacent ends of the pipes to be sealed. This bore seal assembly comprises a cylindrical seal sleeve having a pair of annular sealing lips for sealing against corresponding sealing surfaces formed in the seal pocket, a cylindrical finger spring mounted within the bore of the seal sleeve for urging the seal sleeve against the seal pocket, and a cylindrical wear sleeve mounted within the bore of the finger spring to protect the seal sleeve and finger spring against erosion and hold the entire bore seal assembly together. The finger spring comprises an annular central section and a plurality of fingers extending axially therefrom around the entire circumference of the finger spring. In addition, the wear sleeve includes an annular rib extending radially outwardly from the wear sleeve for engaging the central section of the finger spring. In this manner, the fingers of the finger spring are permitted to flex radially inwardly adjacent the central section as the bore seal assembly is installed and impart a preload force which urges the sealing lips against the sealing surface of the seal pocket.

In certain applications, the inner diameter area of adjoining pipe members adjacent the bore seal is subject to substantial erosive wear. For example, in swivel joints where the wall section becomes gradually thinner due to erosion until a minimum wall thickness is reached. The inner diameter area under the male ball race is particularly susceptible to erosion. When erosion reduces the wall section to its minimum acceptable level, the swivel joint must be replaced. This increases the operating costs of the system in which the swivel joint is employed.

SUMMARY OF THE INVENTION

It is therefore an object of the invention to provide a bore seal assembly which can protect the adjacent areas of the pipe members against erosive wear.

According to the present invention, this and other objects and advantages are achieved by providing a bore seal assembly for sealing between first and second adjoining tubular members which comprises a cylindrical seal sleeve having a bore and two radially outwardly extending sealing lips for engaging a seal pocket formed in the adjacent ends of the tubular members, a cylindrical wear sleeve mounted within the bore for supporting the seal sleeve within the seal pocket, and an elongated erosion sleeve extending longitudinally from the wear sleeve into at least the first tubular member. In this manner, the erosion sleeve protects the inner diameter area of the first tubular member adjacent the wear sleeve against erosive wear. In addition, once the wall section of the erosion sleeve is worn to a minimum thickness, the wear sleeve can be replaced, which is simpler and much less costly than replacing the tubular members.

These and other objects and advantages of the present invention will be made apparent from the following detailed description, with reference to the accompanying drawings.

DETAILED DESCRIPTION OF THE PREFERRED EMBODIMENTS

Figures 1, 2:
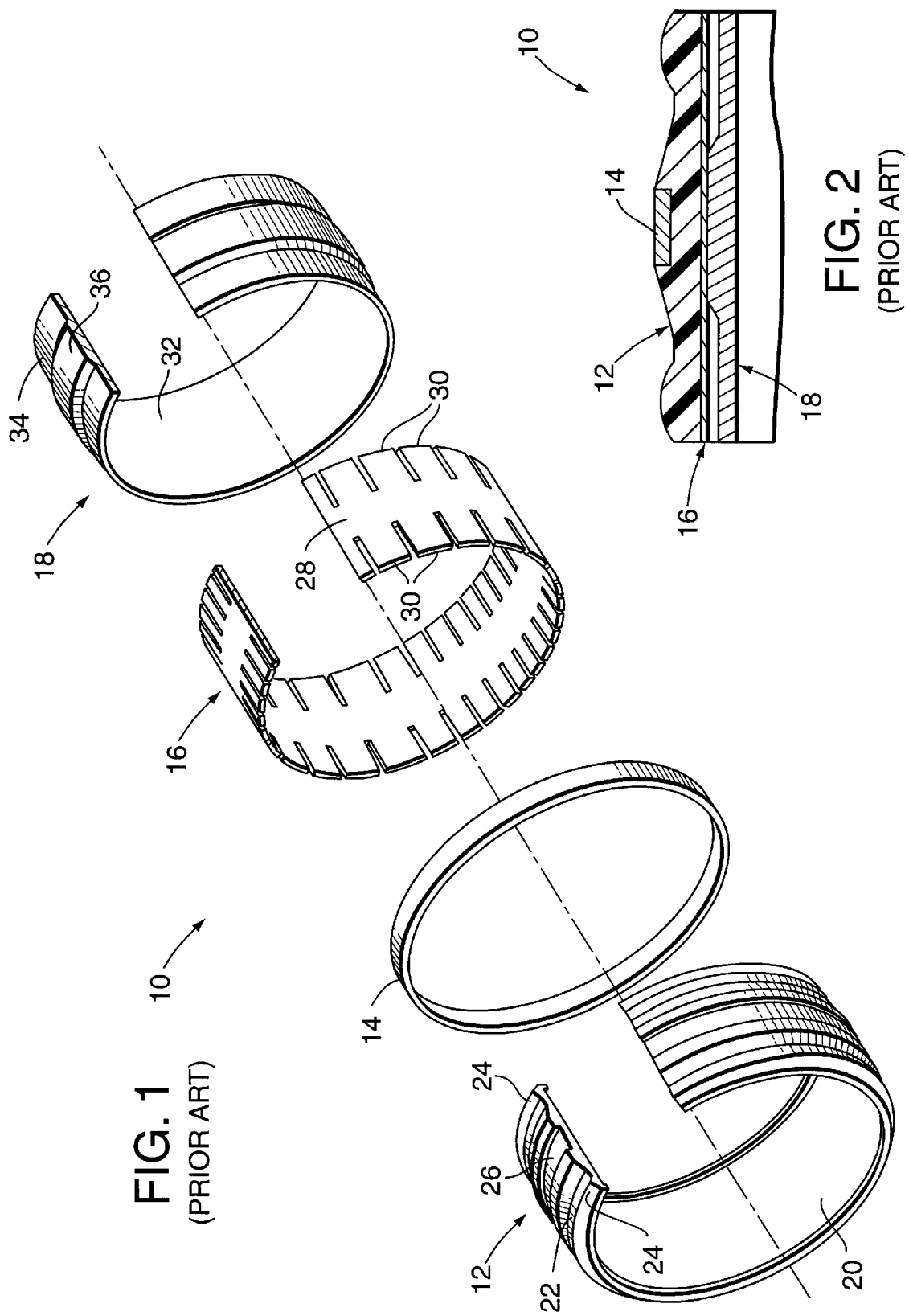
FIG. 1 is an exploded perspective view of a prior art bore seal assembly.
FIG. 2 is a longitudinal section view of the prior art bore seal assembly of FIG. 1 shown in the assembled state.

Referring to FIGS. 1 and 2, a prior art bore seal assembly 10 is shown to comprise a cylindrical seal sleeve 12, a non-extrusion ring 14, a generally cylindrical finger spring 16 and a cylindrical wear sleeve 18. Seal sleeve 12 includes a bore 20 and an outer diameter surface 22 comprising two radially extending annular sealing lips 24 and a annular groove 26. Seal sleeve 12 is typically constructed of a non-metallic material, such as Teflon®. Non-extrusion ring 14 is positioned in groove 26 and functions to prevent seal sleeve 12 from extruding into the gap between two tubular members (see FIG. 3) in high-pressure applications.

Finger spring 16 comprises a solid annular central section 28 and a plurality of fingers 30 extending axially from central section 28 in both directions around the entire circumference of finger spring 16. Finger spring 16 is constructed of a metallic material, and fingers 30 possess spring-like properties which enable them to flex relative to central section 28. Finger spring 16 is positioned within bore 20 of seal sleeve 12 and has a width approximately the same as the width of seal sleeve 12 so that the free ends of fingers 30 will engage the portion of bore 20 beneath sealing lips 24.

Wear sleeve 18 comprises an annular base portion 32 having a throughbore 34 and an outer diameter surface from which an annular rib 36 extends. As best seen in FIG. 2, wear sleeve 18 is positioned within finger spring 16 and rib 36 engages central section 28 of finger spring 16.

Figure 3:
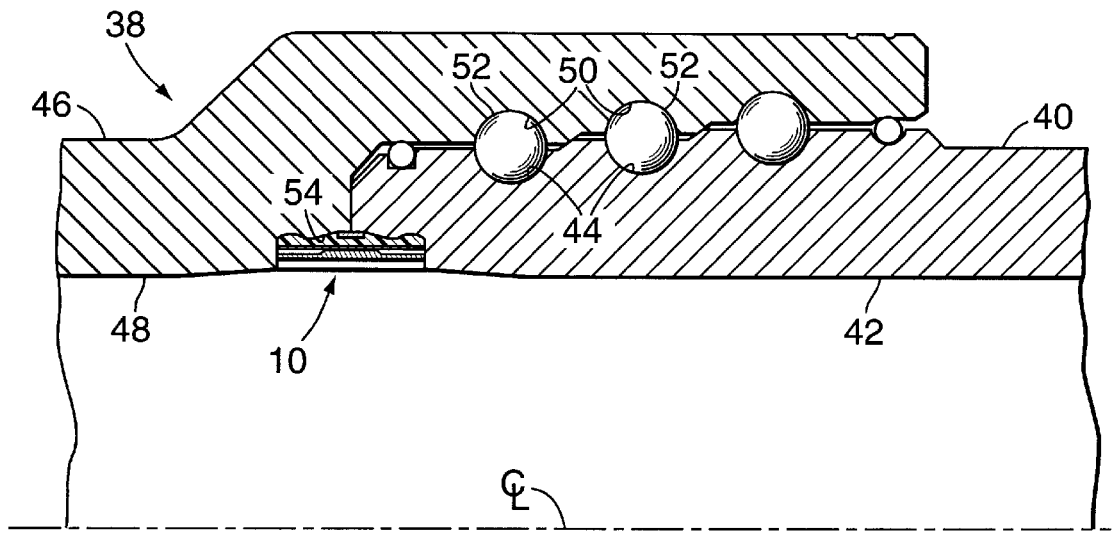
FIG. 3 is a longitudinal section view of the prior art bore seal assembly of FIG. 2 shown installed in a swivel joint.

Referring to FIG. 3, prior art bore seal assembly 10 is shown installed in an exemplary swivel joint 38. In FIG. 3, only the portion of swivel joint 38 above its centerline CL is depicted, it being understood that the portion below the centerline is substantially similar for purposes of the following description. Swivel joint 38 is shown to comprise a tubular male member 40 having a male bore 42 and a plurality of radial grooves 44. Swivel joint 38 also comprises a tubular female member 46 having a female bore 48 and a plurality of radial grooves 50 which, when male member 40 is assembled with female member 46, align with grooves 44 to form a plurality of races into which a number of balls 52 are inserted to secure male member 40 within female member 46 and provide for relative rotation therebetween.

In addition, the diameters of male bore 42 and female bore 48 adjacent the abutting ends of male member 40 and female member 46 are enlarged to form a seal pocket 54 in which bore seal 10 is received to seal between male member 40 and female member 46. Bore seal assembly 10 is sized so that throughbore 34 of wear sleeve 18 is aligned with male bore 42 and female bore 48. When installed, seal sleeve 12 is forced into seal pocket 54 against fingers 30, causing fingers 30 to bend adjacent rib 36 of wear sleeve 18 and create a preload force which urges sealing lips 24 into the sealing surfaces of the seal pocket 54 to effect the seal.

Figure 4:
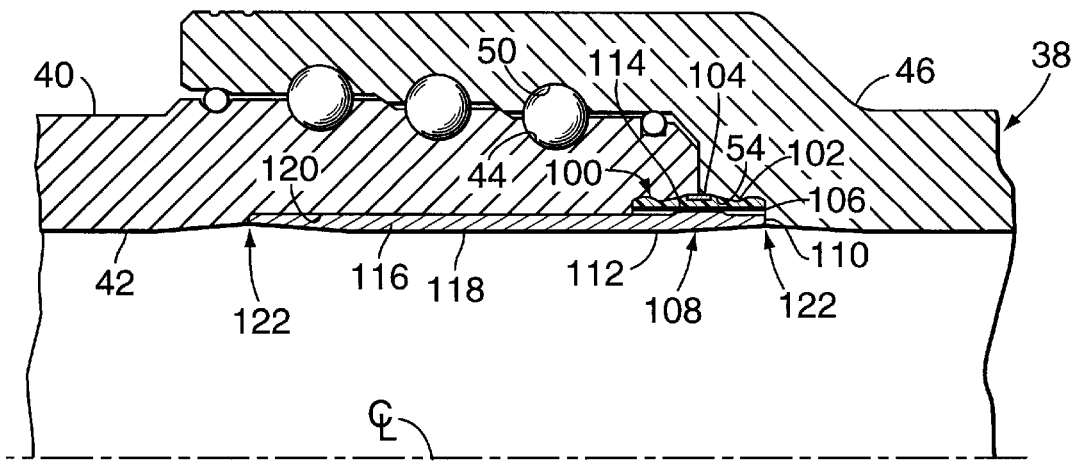
FIG. 4 is a longitudinal section view of the bore seal assembly of the present invention shown installed in a swivel joint.

Referring to FIG. 4, the bore seal assembly of the present invention, indicated generally at 100, shares several components of the prior art bore seal assembly 10. Bore seal assembly 100 includes a seal sleeve 102 similar to seal sleeve 12 and, preferably, a non-extrusion ring 104 and finger spring 106 which are substantially the same as non-extrusion ring 14 and finger spring 16 of bore seal assembly 10.

Bore seal assembly 100 also comprises a wear sleeve 108 which is similar in many respects to wear sleeve 18. Thus, wear sleeve 108 comprises a base portion 110 having a throughbore 112 and an outer diameter surface from which an annular rib 114 extends. However, in accordance with the present invention, wear sleeve 108 is also provided with a erosion sleeve 116 extending longitudinally from base 110. In the embodiment depicted in FIG. 4, erosion sleeve 116 extends into the male member below the ball race defined by grooves 44 and 50, an area which is particularly susceptible to erosion in swivel joints. In this embodiment, erosion sleeve 116 is an integral part of wear sleeve 108, and erosion sleeve 116 therefore includes a throughbore 118 which corresponds with throughbore 112 of wear sleeve 108. In addition, erosion sleeve 116 is preferably positioned within a recess 120 formed by enlarging male bore 42 in the area adjacent bore seal 100. In this manner, throughbores 112 and 118 are in alignment with male bore 42 and female bore 48. Also, as shown in FIG. 4, the ends of wear sleeve 108 and the adjacent portions of male and female bores 42 and 48 may be tapered, as at 122, if required for cleanup during machining of an elbow piece.

Figure 5:
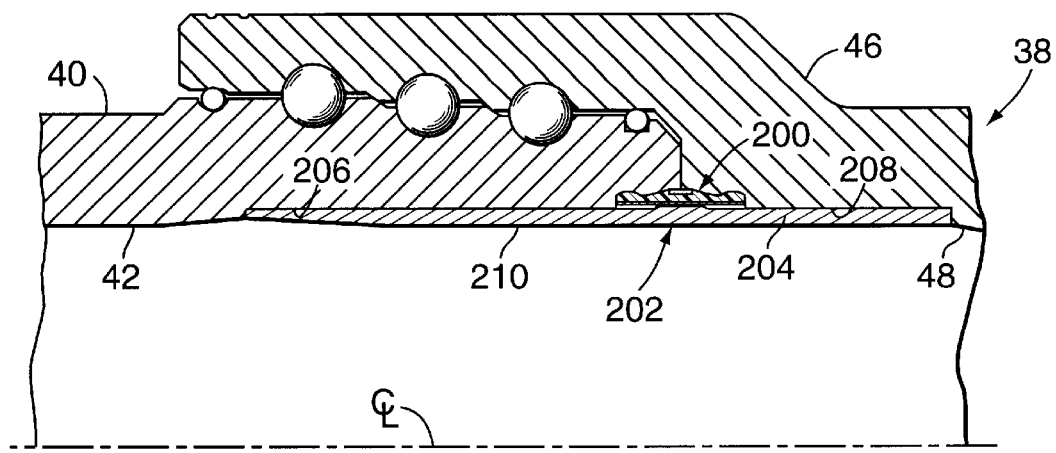
FIG. 5 is a longitudinal section view of another embodiment of the bore seal assembly of the present invention shown installed in a swivel joint.

Another embodiment of the bore seal assembly of the present invention is depicted in FIG. 5. In this embodiment, the bore seal assembly, indicated generally at 200, is provided with a wear sleeve 202 having an erosion sleeve 204 extending longitudinally into both the male member 40 and the female member 46 of the exemplary swivel joint 38. Erosion sleeve 204 is preferably positioned within recesses 206, 208 formed by enlarging the respective male and female bores 42, 48 in the areas adjacent bore seal 200. In this manner, the throughbore 210 of erosion sleeve 204 is in alignment with male bore 42 and female bore 48. In all other respects, bore seal assembly 200 is similar to bore seal assembly 100 described above.

Figure 6:
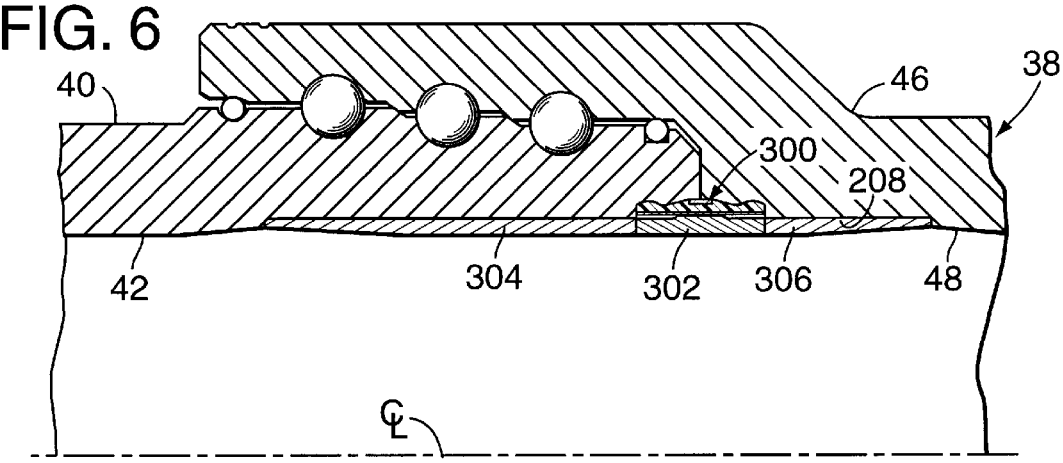
FIG. 6 is a longitudinal section view of yet another embodiment of the bore seal assembly of the present invention shown installed in a swivel joint.

An additional embodiment of the bore seal assembly of the present invention is shown in FIG. 6. In this embodiment, the bore seal assembly, indicated generally by reference number 300, is similar to bore seal assembly 200. However, instead of employing a wear sleeve having an integral erosion sleeve, bore seal assembly 300 includes a wear sleeve 302 similar to wear sleeve 18 and one or more separate erosion sleeves. Thus, in the embodiment depicted in FIG. 6, a first erosion sleeve 304 extends longitudinally from wear sleeve 302 into male member 40 and a second erosion sleeve 306 extends longitudinally from wear sleeve 302 into female member 46. In all other respects, bore seal assembly 300 is similar to bore seal assembly 200 described above.

Figure 7:
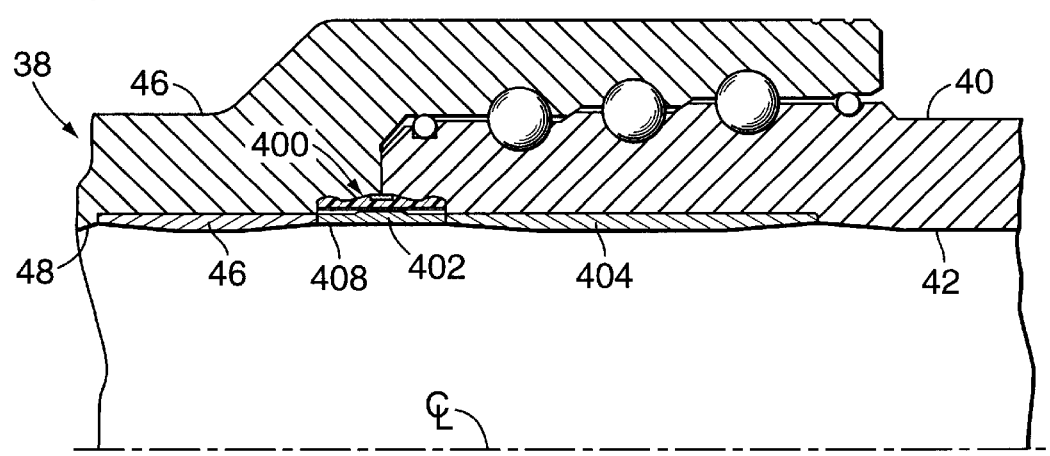
FIG. 7 is a longitudinal section view of another embodiment of the bore seal assembly of the present invention shown installed in a swivel joint.

Yet another embodiment of the present invention is illustrated in FIG. 7. The bore seal assembly of this embodiment, indicated generally at 400, is similar to bore seal assembly 300. However, the wall thickness of wear sleeve 402 is reduced and the adjacent ends of first and second erosion sleeves 404, 406 are tapered to define a cleanup bore 408. In all other respects, bore seal assembly 400 is similar to bore seal assembly 300 described above.

The erosion sleeve of the various embodiments of the bore seal assembly described above may be constructed of steel, plastic, ceramic or any erosion and/or corrosion resistant material, such as stainless steel, electroless nickel plated alloy steel or carbon steel. In addition, the outer diameter of the erosion sleeve is preferably slightly less than the diameter of the bore or recess into which it is received to allow for thermal expansion and easy removal of the erosion sleeve. It should also be understood that, in addition to swivel joints, the bore seal assembly of the present invention may be used in any application requiring sealing between two tubular members.

It should be recognized that, while the present invention has been described in relation to the preferred embodiments thereof, those skilled in the art may develop a wide variation of structural details without departing from the principles of the invention. Therefore, the appended claims are to be construed to cover all equivalents falling within the true scope and spirit of the invention.

What is claimed is:

1. In combination with a joint comprising first and second rotationally connected but disconnectable tubular members, the improvement comprising a bore seal assembly for sealing between the first and second tubular members which comprises:

a cylindrical seal sleeve having a bore and two radially outwardly extending sealing lips for engaging a seal pocket formed in the adjoining ends of the first and second tubular members;

a cylindrical wear sleeve removably mounted within the bore for supporting the seal sleeve within the seal pocket;

at least the first tubular member comprising a bore having an enlarged diameter section forming an elongated recess extending longitudinally into the first tubular member from adjacent the seal pocket;

an elongated erosion sleeve extending approximately the entire length of and removably mounted within the recess;

wherein the erosion sleeve protects the bore of the first tubular member from erosion caused by a fluid flowing through the first and second tubular members; and wherein the tubular members may be disconnected and the erosion sleeve removed and replaced.

2. The joint of claim 1, wherein the erosion sleeve is connected to the wear sleeve and the erosion sleeve and the wear sleeve may therefore be removed and replaced as a unit.

* * * * *